United States Patent [19]

Kouno et al.

[11] Patent Number: 4,795,795

[45] Date of Patent: Jan. 3, 1989

[54] CATALYTIC PREPARATION OF POLYAMIDE OR POLYAMIDE-POLYIMIDE WITH N,N'-DIMETHYL ALKYLENE UREA SOLVENT

[75] Inventors: Masahiro Kouno, Manazuru; Kazumi Mizutani; Masanori Osawa, both of Yokohama; Kohei Shizuka, Fujisawa; Toshihiro Toyoda, Tokai; Hiromi Nakano, Zushi, all of Japan

[73] Assignee: Mitsui Toatsu Chemicals, Incorporated, Tokyo, Japan

[21] Appl. No.: 828,530

[22] Filed: Feb. 12, 1986

[30] Foreign Application Priority Data

| Feb. 20, 1985 | [JP] | Japan | 60-030529 |
|---|---|---|---|
| Feb. 21, 1985 | [JP] | Japan | 60-031489 |
| Feb. 21, 1985 | [JP] | Japan | 60-031490 |
| Feb. 21, 1985 | [JP] | Japan | 60-031491 |
| Mar. 8, 1985 | [JP] | Japan | 60-044756 |

[51] Int. Cl.$^4$ .................................. C08G 18/34
[52] U.S. Cl. .................................. 528/53; 528/48; 528/342
[58] Field of Search .................................. 528/53, 48

[56] References Cited

U.S. PATENT DOCUMENTS

| 4,061,622 | 12/1977 | Onder | 260/78 |
|---|---|---|---|
| 4,094,866 | 6/1978 | Onder | 260/78 |
| 4,156,065 | 5/1979 | Onder et al. | 528/51 |
| 4,395,531 | 7/1983 | Toyoda et al. | 528/49 |

FOREIGN PATENT DOCUMENTS

| 58-13629 | 1/1983 | Japan . |
|---|---|---|
| 58-67723 | 4/1983 | Japan . |
| 61-14219 | 1/1986 | Japan . |
| 61-14220 | 1/1986 | Japan . |

Primary Examiner—Harold D. Anderson
Attorney, Agent, or Firm—Fisher, Christen & Sabol

[57] ABSTRACT

A polyamide and/or polyimide is prepared by using N,N'-dimethylethyleneurea or N,N'-dimethylpropyleneurea as a solvent upon polycondensation of a polycarboxylic acid and a diisocyanate at a temperature above 100° C. in the presence of an alkali metal carbonate, alkali metal hydrogencarbonate, alkali metal hydroxide or an alkali metal salt of a polycarboxylic acid.

21 Claims, No Drawings

CATALYTIC PREPARATION OF POLYAMIDE OR POLYAMIDE-POLYIMIDE WITH N,N'-DIMETHYL ALKYLENE UREA SOLVENT

BACKGROUND OF THE INVENTION

1. Field of the Invention

This invention relates to an improved preparation process of a polyamide and/or polyimide from a polycarboxylic acid and a diisocyanate.

2. Description of the Prior Art

It has already been known to prepare polyamides from dicarboxylic acids and diisocyanates. It has also been known to prepare polyamide acids from tricarboxylic acids or tetracarboxylic acids and diisocyanates and in addition, to prepare polyamide-imides or polyimides by using the polyamide acids as precursors and then forming imide bonds therein through intramolecular dehydration ring closure reactions. In order to prepare a polyamide, polyamide acid or a polyamide acid containing imide oonds at some portions of its molecular chain by the above-described corresponding reaction, its preparation is generally carried out by reacting its corresponding polycarboxylic acid and polyisocyanate at a temperature of room temperature-250° C. for 1-20 hours in an organic polar solvent. However, the reaction product is usually accompanied by such problems as increased melt viscosity and decreased solubility because the above reaction tends to yield an often-branched or crosslinked polyamide or polyamide acid of a lower molecular weight compared with polyamides prepared from diamines and dibasic acid dihalides or polyamide acids prepared from diamines and tricarboxylic anhydride halides or tetracarboxylic dianhydrides. It has hence been difficult to obtain high-molecular linear polymers suitable for their processing as melts or solutions.

As epoch-making processes for the preparation of high-molecular polyamides from polycarboxylic acids and diisocyanates, the present inventors have already invented a process making use of an alkali metal salt of a polycarboxylic acid as a catalyst (U.S. Pat. No. 4,395,531), a process relying upon an alkali metal carbonate or hydrogencarbonate as a catalyst (Japanese Patent Laid-Open No. 13629/1983), a process employing an alkali metal hydroxide as a catalyst (Japanese Patent Laid-Open No. 67723/1983) and so on. Further, the present inventors have also proposed to use purified sulfolane as a solvent in Japanese Patent Application No. 134130/1984 filed on June 30, 1984 and Japanese Patent Application No. 134131/1984 filed on the same day.

As catalysts useful for similar reactions, there have been known alkali metal alkoxides and phenoxides (U.S. Pat. No. 4,061,622), alkali metal lactamates (U.S. Pat. No. 4,094,866), cyclic phosphorus oxides (U.S. Pat. No. 4,156,065; Japanese Patent Laid-Open No. 92703/1978), and the like. These prior art processes use, as solvents, linear or cyclic amides or phosphoryl amides such as dimethylformamide, dimethylacetamide, N-methyl-2-pyrrolidone, γ-butyrolactone and hexamethylphosphoric triamide, sulfoxides or sulfones such as tetramethylenesulfone, diphenylsulfone and dimethylsulfoxide, or tetramethylurea.

These prior art processes are however accompanied by such problems that when a diisocyanate and a polycarboxylic acid are reacted at an elevated temperature in the presence of a polar solvent, the resulting polymer is colored yellow or brown and its value as a commercial product is hence lowered. Since the solubility of the resulting polymer to the solvent may be low depending on the combination of specific starting monomers, additional problems may be encountered, namely, the polymer may be caused to separate out in the course of the polymerization while its molecular weight is still low or the resulting polymer requires complex post treatment steps after completion of its polymerization, thereby making its industrial production difficult. It has been a long standing desire to solve these problems simultaneously and satisfactorily.

SUMMARY OF THE INVENTION

An object of this invention is to provide a process for the preparation of a polyamide and/or polyimide each of which has a good color hue and a high molecular weight.

Another object of this invention is to provide a process for the preparation of a polyamide and/or polyimide, which process is free from separation of a low molecular polymer during the polymerization and does not require complex post treatment steps after completion of the polymerization.

A further object of this invention is to provide a process for the preparation of an aromatic polyamide having a high degree of crystallinity, a good color hue and a high molecular weight.

The following preparation process of a polyamide and/or polyimide has been provided by the present invention.

In a process for preparing a polyamide and/or polyimide by subjecting a polycarboxylic acid represented by the following formula (I):

$$R^1(COOH)_n \qquad (I)$$

wherein $R^1$ is either absent or an organic group having a valency of 2-4, two of the three carboxyl groups bonded to $R^1$ are bonded at such positions as permitting formation of an acid anhydride when $R^1$ is a trivalent organic group, the four carboxyl groups bonded to $R^1$ are bonded at such positions as permitting formation of 2 sets of acid anhydrides when $R^1$ is a tetravalent organic group, and n stands for an integer of 2-4, and a diisocyanate represented by the following formula (II):

$$OCN-R^2-NCO \qquad (II)$$

wherein $R^2$ is a divalent organic group to polycondensation at a temperature above 100° C. in the presence of an alkali metal carbonate, alkali metal hydrogencarbonate, alkali metal hydroxide or an alkali metal salt of a polycarboxylic acid, said alkali metal salt being represented by the following formula (III):

$$R^1(COOH)_l(COOM)_m \qquad (III)$$

wherein $R^1$ has the same meaning as defined in the formula (I), M denotes an alkali metal, l is an integer of 0-3, m stands for an integer of 1-4 and l+m is 2-4, the improvement wherein an N,N'-dimethylalkyleneurea compound represented by the following formula (IV):

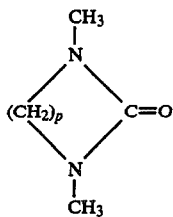

(IV)

wherein p stands for 2 or 3 is used as a solvent.

DETAILED DESCRIPTION OF THE INVENTION

The organic group $R^1$ having a valency of 2–4 in the above formulae (I) and (III) and the divalent organic group $R^2$ in the above formula (II) are preferably aliphatic, aromatic, alicyclic and/or heterocyclic groups, each of which may optionally be substituted by one or more groups or atoms substantially inert to carboxyl groups and isocyanate groups, for example, alkyl groups, cycloalkyl groups, aryl groups, alkoxy groups, halogen atoms and/or the like. Further, two or more of these groups may be coupled together, for example, by way of C—C bond or bonds. Alternatively, they may be coupled together via alkylene groups, —O—, —S—,

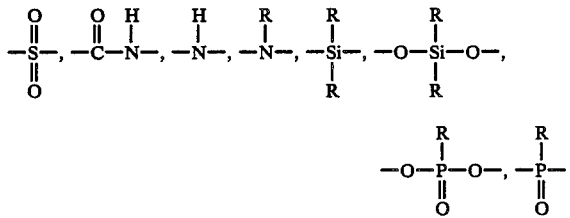

or the like, in which R means an alkyl, cycloalkyl or aryl group and when two R substituents are bonded, they may be different.).

The followings are illustrative examples of the polycarboxylic acid represented by the formula (I).

When n=2 in the formula (I), illustrative of the polycarboxylic acid may include malonic acid, fumaric acid, succinic acid, glutaric acid, adipic acid, pimelic acid, suberic acid, azelaic acid, sebacic acid, terephthalic acid, isophthalic acid, hexahydroterephthalic acid, diphenylether-4,4'-dicarboxylic acid, diphenylsulfone-4,4'-dicarboxylic acid, biphenyl-4,4'-dicarboxylic acid, thiophene-2,5-dicarboxylic acid, pyridine-2,6-dicarboxylic acid, naphthalene-2,6-dicarboxylic acid, 4,4'-diphenylether-bis-trimellitic imide acid, and 4,4'-diphenylmethane-bis-trimellitic imide acid.

When n=3 in the formula (I), illustrative of the polycarboxylic acid may include butane-1,2,4-tricarboxylic acid, pentane-1,2,5-tricarboxylic acid, cyclohexane-1,2,3-tricarboxylic acid, cyclopentadienyl-3,4,4'-tricarboxylic acid, cyclopentadienyl-1,2,4-tricarboxylic acid, benzene-1,2,4-tricarboxylic acid (trimellitic acid), benzene-1,2,3-tricarboxylic acid, naphthalene-1,2,4-tricarboxylic acid, naphthalene-1,2,5-tricarboxylic acid, naphthalene-2,3,5-tricarboxylic acid, naphthalene-2,3,6-tricarboxylic acid, 3,4,4'-biphenyltricarboxylic acid, 2,3,2'-biphenyltricarboxylic acid, 3,4,3'-diphenylsulfonetricarboxylic acid, 3,4,4'-diphenylethertricarboxylic acid, 3,4,4'-benzophenonetricarboxylic acid, 3,3',4-benzophenonetricarboxylic acid, perylene-3,4,9-tricarboxylic acid, 2-(3,4-dicarboxyphenyl)-2-(3-carboxyphenyl)propane, 2-(2,3-dicarboxyphenyl)-2-(3-carboxyphenyl)propane, 1-(2,3-dicarboxyphenyl)-1-(3-carboxyphenyl)ethane, 1-(3,4-dicarboxyphenyl)-1-(4-carboxyphenyl)ethane, (2,3-dicarboxyphenyl)-(2-carboxyphenyl)methane, 2-(3,4-dicarboxyphenyl)-5-(3-carboxyphenyl)-1,3,4-oxadiazole and 2,3,5-pyrazinetricarboxylic acid.

When n=4 in the formula (I), illustrative of the polycarboxylic acid may include butane-1,2,3,4-tetracarboxylic acid, pentane-1,2,4,5-tetracarboxylic acid, cyclobutane-1,2,3,4-tetracarboxylic acid, cyclopentane-1,2,3,4-tetracarboxylic acid, cyclohexane-1,2,3,4-tetracarboxylic acid, benzene-1,2,4,5-tetracarboxylic acid (pyromellitic acid), naphthalene-1,4,5,8-tetracarboxylic acid, naphthalene-2,3,6,7-tetracarboxylic acid, naphtalene-1,2,4,5-tetracarboxylic acid, 3,3',4,4'-biphenyltetracarboxylic acid, 2,3,5,6-biphenyltetracarboxylic acid, 2,2',3,3'-biphenyltetracarboxylic acid, 2,2',6,6'-biphenyltetracarboxylic acid, 3,3',4,4'-benzophenonetetracarboxylic acid, 2,2',3,3'-benzophenonetetracarboxylic acid, 2,3,3',4'-benzophenonetetracarboxylic acid, 3,3',4,4'-diphenylethertetracarboxylic acid, 3,3',4,4'-diphenylsulfonetetracarboxylic acid, perylene-3,4,9,10-tetracarboxylic acid, phenanthrene-1,8,9,10-tetracarboxylic acid, anthracene-2,3,6,7-tetracarboxylic acid, p-benzoquinone-2,3,5,6-tetracarboxylic acid, azobenzene-3,3',4,4'-tetracarboxylic acid, 2,2-bis(3,4-dicarboxyphenyl)propane,2,2-bis(2,3-dicarboxyphenyl)propane, 1,1-bis(2,3-dicarboxyphenyl)ethane, bis(2,3-dicarboxyphenyl)methane, bis(3,4-dicarboxyphenyl)methane, 2,2-bis(3,4-dicarboxyphenyl)hexafluoropropane, thiophene-2,3,4,5-tetracarboxylic acid, furan-2,3,4,5-tetracarboxylic acid, and pyridine-2,3,5,6-tetracarboxylic acid.

Preferred examples of the above-described polycarboxylic acids are as follows.

When n=2 in the formula (I), fumaric acid, malonic acid, adipic acid, terephthalic acid, isophthalic acid, diphenylether-4,4'-dicarboxylic acid and pyridine-2,6-dicarboxylic acid may be mentioned. When n=3, butane-1,2,4-tricarboxylic acid, benzene-1,2,4-tricarboxylic acid (trimellitic acid) and naphthalene-1,2,4-tricarboxylic acid may be mentioned. When n=4 on the other hand, butane-1,2,3,4-tetracarboxylic acid, cyclobutane-1,2,3,4-tetracarboxylic acid, benzene-1,2,4,5-tetracarboxylic acid (pyromellitic acid), 3,3',4,4'-benzophenonetetracarboxylic acid and 3,3',4,4'-diphenylethertetracarboxylic acid may be mentioned.

The polycarboxylic acid may contain intramolecular acid anhydride groups at some portions thereof. Two or more polycarboxylic acids may be used in combination.

As exemplary diisocyanates represented by the formula (II), may be mentioned 1,2-diisocyanate ethane, 1,2-diisocyanate propane, tetramethylene-1,4-diisocyanate, pentamethylene-1,5-diisocyanate, hexamethylene-1,6-diisocyanate, nonamethylene-1,9-diisocyanate, decamethylene-1,10-diisocyanate, ω,ω'-dipropylether diisocyanate, cyclohexane-1,4-diisocyanate, dicyclohexylmethane-4,4'-diisocyanate, hexahydrobiphenyl-4,4'-diisocyanate, hexahydrodiphenylether-4,4'-diisocyanate, phenylene-1,3-diisocyanate, phenylene-1,4-diisocyanate, tolylene-2,6-diisocyanate, tolylene-2,4-diisocyanate, 1-methoxybenzene-2,4-diisocyanate, 1-chlorophenylenediisocyanate, tetrachlorophenylenediisocyanate, metaxylylenediisocyanate, paraxylylenediisocyanate, diphenylmethane-4,4'-diisocyanate, diphenylsulfide-4,4'-diisocyanate, diphenylsulfone-4,4'-diisocyanate, diphenylether-4,4'-diisocyanate, diphenylether-3,4'-diisocyanate, diphenylketone-4,4'-diisocyanate, naphthalene-2,6-diisocyanate, naphthalene-1,4-diisocyanate, naphthalene-1,5-diisocyanate, 2,4'-biphenyldiisocyanate, 4,4'-biphenyldiisocyanate, 3,3'-dimethoxy-4,4'-biphenyldiisocyanate, anthraquinone-2,6-diisocyanate, triphenylmethane-4,4'-diisocyanate, and azobenzene-4,4'-diisocyanate.

Among the above-given diisocyanates, preferred examples may include hexamethylene-1,6-diisocyanate, cyclohexane-1,4-diisocyanate, phenylene-1,3-diisocyanate, tolylene-2,4-diisocyanate, tolylene-2,6-diisocyanate, diphenylmethane-4,4'-diisocyanate, and diphenylether-4,4'-diisocyanate. Two or more of these diisocyanates may be used in combination.

By combining compounds having such various skeletal structures and bonds as described above as the polycaboxylic acid and diisocyanate represented respectively by the formulae (I) and (II), it is possible to control the processability, chemical, thermal and electrical properties and mechanical properties of the resulting polymer as desired.

In the present invention, it is particularly preferred to combine terephthalic acid and/or isophthalic acid as polycarboxylic acid(s) and tolylene-2,4-diisocyanate and/or tolylene-2,6-diisocyanate as diisocyanate(s).

Illustrative of the alkali metal carbonate and alkali metal hydrogencarbonate useful as catalysts in the practice of the process of this invention may include lithium carbonate, sodium carbonate, potassium carbonate, rubidium carbonate, cesium carbonate, francium carbonate, lithium hydrogencarbonate, sodium hydrogencarbonate, potassium hydrogen carbonate, rubidium hydrogencarbonate, cesium hydrogencarbonate and francium hydrogen carbonate. Among these, potassium carbonate, sodium carbonate, potassium hydrogencarbonate and sodium hydrogencarbonate are preferred.

On the other hand, illustrative of the alkali metal hydroxide useful as a catalyst may include lithium hydroxide, sodium hydroxide, potassium hydroxide, rubidium hydroxide, cesium hydroxide and francium hydroxide with potassium hydroxide and sodium hydroxide being particularly preferred.

As the alkali metal salt of the polycarboxylic acid which salt is employed as a catalyst and is represented by the formula (III), it is preferred to use an alkali metal salt which is advantageous from both industrial and economical viewpoints. Especially preferred effects can however be brought about when an alkali metal salt of a polycarboxylic acid having a structure similar to the polycarboxylic acid of the formula (I) which is employed in the polymerization. As exemplary alkali metal salts, may be mentioned the mono-, di-, tri- and/or tetra-lithium, sodium, potassium, rubidium, cesium and francium salts of dicarboxylic acids, tricarboxylic acids and tetracarboxylic acids. More preferably, the monosodium or monopotassium salt of isophthalic or terephthalic acid may be mentioned.

Although no significant differences are observed in effects among the above-described three types of alkali metal compounds as catalysts, it is preferred to use an alkali metal salt of a polycarboxylic acid of the formula (III) in view of influence of impurities and the like which are usually contained in such compounds.

The N,N'-dimethylalkyleneurea of formula (IV) useful as a solvent in the practice of the process of this invention is either N,N'-dimethylethyleneurea or N,N'-dimethylpropyleneurea. However, the former compound is particularly preferred. It is necessary to use the solvent in a substantially anhydrous state. Other solvent or solvents inert to the polymerization reaction, for example, benzene, toluene, xylene and/or the like may also be used together with the N,N'-dimethylalkyleneurea.

In the process of this invention, it is a prerequisite to use the above-described catalyst for the preparation of a high-molecular polyamide and/or polyimide of good color hue from a polycarboxylic acid and diisocyanate. It is an essential requirement to use the N,N'-dimethylalkyleneurea represented by the formula (IV) as a polymerization solvent. Owing to the combined use of the above-described catalyst and N,N'-dimethylalkyleneurea solvent, it has become possible to prepare a polymer free of severe coloration, which has remained as a problem with amide-type solvents employed widely for the preparation of polyamides from polycarboxylic acids and diisocyanates and is believed to occur by side reactions with the isocyanates, and having an extremely good color hue, and the effect of the catalyst owing to its combined use is still better than that achieved by its combined use with the above-mentioned amide-type solvents, thereby making it possible to prepare a high-molecular polymer.

In the present invention, the temperature of the polycondensation reaction may preferably be above 100° C. but below the boiling point of the solvent. Any temperatures lower than 100° C. will not be able to bring the reaction to completion, whereby no polymers will be obtained with high molecular weights and good thermal stability. The reaction time may usually be 1–20 hours. The reaction can be considered to have reached its completion at a time point where byproduced carbon dioxide is no longer substantially evolved.

The molar ratio of the diisocyanate to the polycarboxylic acid may preferably be in a range of 0.70–1.30 with a range of 0.95–1.10 being particularly preferred. It is most preferable to use them substantially in equivalent amounts.

The catalyst, i.e., the alkali metal compound may preferably be added in an amount of 0.10–20 mole %, typically 0.5–10 mole %, both based on the polycarboxylic acid as a raw material.

The starting monomers and the catalyst, i.e., alkali metal salt may be added in an arbitrary order by a suitable method. It is simple and convenient to dissolve them at room temperature in the solvent either simultaneously or successively. In some instances, it is possible to add either one of the starting monomers, preferably, the diisocyanate continuously at the reaction temperature.

In general, the total concentration of the starting monomers (the polycarboxylic acid+the diisocyanate) is chosen from a range of 50–400 g/l at the beginning of the polymerization reaction. The selection of this concentration should however be made in accordance with the reactivity of the starting monomers, the solubility of the resulting polymer in the solvent, etc. When the polymerization is started at a high concentration, it may, in some instances, be preferable to feed an additional portion of the solvent either continuously or non-continuously in order to avoid any substantial hindrance to the stirring due to increased viscosity in the course of the polymerization.

The reaction of the process of this invention is a $CO_2$-removing reaction and $CO_2$ is given off in a gaseous from. Compared with the HCl-removing or H₂O-removing reaction between amino groups and an acid halide or acid, its removal is extremely easy and moreover, there is no danger of side reactions or polymer deterioration due to byproducts.

To form imido bonds from a practically linear high-molecular polyamide acid obtained in accordance with the process of this invention, it is possible to use any chemical or physical method which is employed routinely. The method should however differ depending on the final form of each intended product. In the case of films or molded articles for instance, void-free products may generally be obtained by carefully effecting their heating within a temperature range of 150°–350° C. and removal of condensed water at the same time. When spinning fibers for a solution, a heat treatment may be carefully applied or a dehydrating agent such as acetic anhydride may be added.

The recurring unit of the polymer obtained in accordance with this invention is a polyamide or polyamide acid represented by the following formula (V):

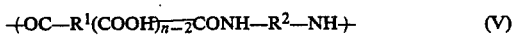
$$\text{+OC—R}^1\text{(COOH)}_{\overline{n-2}}\text{CONH—R}^2\text{—NH+} \quad \text{(V)}$$

The polymer may also contain polyimido units which include imido bonds formed by subjecting the recurring unit of the formula (V) as a precursor to intramolecular ring closure and are respectively represented by the following formulae (VI) and (VII):

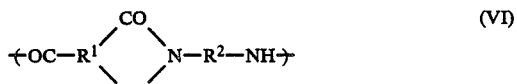

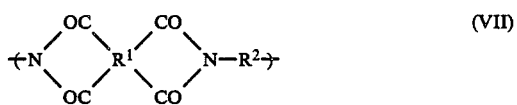

In the above formulae (V), (VI) and (VII), $R^1$, $R^2$ and n have the same meaning as defined in the formulae (I) and (II).

Polymers prepared in accordance with the present invention are useful as high-performance industrial materials such as various industrial materials, radiation shields, composite materials, reinforcing materials and electrical insulating materials by making effective use of their excellent heat resistance, heat-insulating properties, radiation resistance, thermal dimensional stability, mechanical properties, electrical properties, chemical resistance, flame retardancy, etc. They can thus be used widely as molded articles, films, papers, fibers, varnishes, adhesives and the like in the fields of electrical and electronic appliances, automobile, vehicles, aircraft, apparel and interior-finishing materials.

A further description will next be made on a particularly preferred combinatinn of raw materials in the present invention, namely, the combination of tolylene-2,4-diisocyanate and/or tolylene-2,6-diisocyanate and terephthalic acid and/or isophthalic acid.

In the case of the combination of tolylene-2,4-diisocyanate and isophthalic or terephthalic acid, tolylene-2,4-diisocyanate which is to be used is usually produced by using tolylenediamine as a starting raw material and reacting it with phosgene and then purifying and separating the reaction product. Industrial tolylene-2,4-diisocyanate usually contains several mole % of tolylene-2,6-diisocyanate as an isomer. Even if tolylene-2,6-diisocyanate is contained in an amount up to 10 mole %, the resulting polymer will be satisfactory for practical applications since it will have physical properties similar to those of poly(4-methyl-1,3-phenyleneisophthalic amide) [recurring unit:

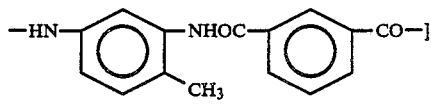

or poly(4-methyl-1,3-phenyleneterephthalic amide) [recurring unit:

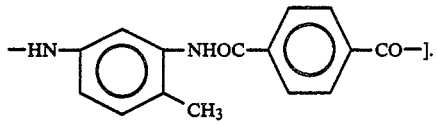

Even if one of the monomers, i.e., isophthalic acid is copolymerized after adding terephthalic acid as a comonomer to the isophthalic acid, the resulting polymer will be have physical properties similar to those of poly(4-methyl-1,3-phenyleneisophthalic amide) and will hence be satisfactory for practical applications provided that the amount of the added terephthalic acid is 10 mole % or less of the isophthalic acid.

When one of the monomers is terephthalic acid, the resulting polymer will have physical properties similar to those of poly(4-methyl-1,3-phenyleneterephthalic amide) and will hence be satisfactory for practical applications provided that the amount of the isophthalic acid as the comonomer is 10 mole % or less of the terephthalic acid.

In the case of the combination of tolylene-2,6-diisocyanate and isophthalic or terephthalic acid, tolylene-2,6-diisocyanate which is to be used is usually synthesized by using tolylenediamine as a starting raw material and reacting it with phosgene and then purifying and separating the reaction product. Accordingly, it is industrially difficult to remove the isomer, i.e., tolylene-2,4-diisocyanate to obtain tolylenediamine-2,6-diisocyanate in a highly pure form. Even if tolylene-2,4-diisocyanate is contained in an amount up to 10 mole %, the resulting polymer will however have physical properties similar to those of poly(2-methyl-1,3-phenyleneterephthalic amide) or poly(2-methyl-1,3-phenyleneisophthalic amide) and will hence be satisfactory for practical applications.

Even if one of the monomers, i.e., isophthalic acid contains terephthalic acid in an amount of 10 mole or less of the isophthalic acid, the resulting polymer will have physical properties similar to those of poly(2-methyl-1,3-phenyleneisophthalic amide) and will also be satisfactory for practical applications. Even if one of the monomers, i.e., terephthalic acid contains isophthalic acid in an amount of 10 mole % or less of the terephthalic acid on the contrary, the resulting polymer will however have physical properties similar to those of poly(2-methyl-1,3-phenyleneterephthalic amide) and will also be satisfactory for practical applications.

In the case of the combination of tolylene-2,4-diisocyanate and/or tolylene-2,6-diisocyanate and isophthalic acid and/or terephthalic acid, a crystalline polymer can be obtained under the abovedescribed polymerization conditions. Although the polymer is allowed to have high concentrations up to 25 wt. % at the time of its polymerization, the optimum concentration is chosen depending on the intended molecular weight of the polymer and the selected polymerization temperature. If the viscosity of the polymer solution is so high that its stirring is hindered, the polymer solution may be suitably diluted with a solvent.

According to the present invention, no low-molecular polymer is caused to separate out during the polymerization, whereby a substantially-linear polyamide and/or polyimide having a good color hue and a high molecular weight can be obtained without need for complex post treatment steps subsequent to the completion of the polymerization.

In the case of the combination of tolylene-2,4-diisocyanate and/or tolylene-2,6-diisocyanate and isophthalic acid and/or terephthalic acid, it is possible to make with ease the polymer have a higher molecular weight so as to derive sufficient fiber strength. In addition, the resulting polymer has high solubility to the solvent, whereby its economical production at a high concentration is therefore feasible.

The above-described various effects can be attributed to the fact that the N,N'-dimethylalkyleneurea solvent has strong solubility for polyamides, notably, aromatic polyamides owing to its great polarity and the side reactions between the solvent and raw materials under the polymerization conditions are almost ignorably little.

The process of this invention will hereinafter be described by the following Examples. It should however be borne in mind that the present invention is not limited by the Examples.

In the following Examples, inherent viscosity ($\eta_{inh}$) is expressed by the following equation:

$$\eta_{inh} = \frac{\ln(t/t_o)}{C}$$

where
$t_o$ = the falling time of a solvent in a viscometer.
$t$ = the falling time of a dilute solution of a polymer in the same solvent in the viscometer.
$C$ = the concentration of the polymer in 100 ml of the solvent, expressed in terms of number of grams.

In the Examples, the inherent viscosities were each measured at a concentration of 0.1 g polymer/100 ml solvent and a temperature of 30° C. by using 95% concentrated sulfuric acid as a solvent unless otherwise specifically indicated. In the case of polyamide acid (or partial polyimide), N,N-dimethylacetamide (DMAc) was used as a solvent.

EXAMPLE 1

Charged in a 500-ml separable flask fitted with a stirrer, thermometer, condenser, dropping funnel and nitrogen inlet tube were 8.30 g (0.05 mole) of isophthalic acid, 8.30 g (0.05 mole) of terephthalic acid, 0.188 g (0.001 mole) of sodium hydrogen-isophthalate and 370 ml of anhydrous N,N'-dimethylethyleneurea. While stirring the contents in a nitrogen gas atmosphere, they were heated to 200° C. over an oil bath so as to dissolve them completely.

Thereafter, a solution which had been obtained by dissolving 17.76 g (0.102 mole) of an 80:20 (by molar ratio) mixture of tolylene-2,4-diisocyanate and tolylene-2,6-diisocyanate in 50 ml of anhydrous N,N'-dimethylethyleneurea was added dropwise over 6 hours from the dropping funnel. The viscosity of the reaction mixture increased gradually while maintaining a light yellowish color. After proceeding with the reaction for additional 2 hours, the heating was stopped and the reaction mixture was allowed to cool down to room temperature with stirring. A portion (about 20 ml) of the cooled reaction mixture was poured into 500 ml of water which was being stirred in a mixer, thereby cauiing the resultant polymer to precipitate. The polymer was collected by filtration. After stirring and washing it in 500 ml of methanol twice, it was dried at 150° C. for 3 hours under a reduced pressure of 2–3 mmHg to obtain milky white polymer powder. Its inherent viscosity was 2.15.

COMPARATIVE EXAMPLE 1

A reaction was carried out in the same manner as in Example 1 except that anhydrous N-methyl-2-pyrrolidone was used in place of the anhydrous N,N'-dimethylethyleneurea.

The reaction mixture was colored brown, and the resultant polymer powder was light yellowish and its inherent viscosity was 1.56.

EXAMPLE 2

In an apparatus similar to that employed in Example 1, were charged 16.61 g (0.10 mole) of isophthalic acid, 0.212 g (0.002 mole) of anhydrous sodium carbonate and 370 ml of anhydrous N,N'-dimethylethyleneurea. While stirring the contents in a nitrogen gas atmosphere, they were heated to 200° C. over an oil bath so as to dissolve them completely.

Thereafter, a solution which had been obtained by dissolving 17.76 g (0.102 mole) of a 65:35 (by molar ratio) mixture of tolylene-2,4-diisocyanate and tolylene-2,6-diisocyanate in 50 ml of anhydrous N,N'-dimethylethyleneurea was added dropwise over 6 hours from the dropping funnel. After proceeding with the reaction for additional 2 hours, the heating was stopped and the reaction mixture was allowed to cool down to room temperature with stirring.

The cooled reaction mixture was poured into 2 l of water in the same manner as in Example 1, thereby causing the resultant polymer to precipitate. The polymer was collected by filtration. After stirring and washing it in 2 l of methanol twice, it was dried at 150° C. for 5 hours under a reduced pressure of 2–3 mmHg to obtain milky white polymer powder. Its inherent viscosity was 1.95.

COMPARATIVE EXAMPLE 2

A reaction was carried out in the same manner as in Example 2 except that anhydrous N,N-dimethylacetamide was used in place of the anhydrous N,N'-dimethylethyleneurea and the reaction temperature was changed from 200° C. to 160° C.

The reaction mixture was colored brown, and the resultant polymer powder was light yellowish and its inherent viscosity was 0.93.

EXAMPLE 3

A reaction was carried out in the same manner as in Example 2 except that the isophthalic acid was changed to terephthalic acid, the 0.212 g (0.002 mole) of anhydrous sodium carbonate was changed to 0.204 g (0.001 mole) of monopotassium terephthalate, and anhydrous N,N'-dimethylpropyleneurea was substituted for the N,N'-dimethylethyleneurea. Milky white polymer powder was obtained. Its inherent viscosity was 2.23.

EXAMPLE 4

In an apparatus similar to that employed in Example 1, were charged 21.0 g (0.10 mole) of trimellitic acid 0.188 g (0.001 mole) of sodium hydrogenisophthalate and 400 ml of anhydrous N,N'-dimethylethyleneurea. While stirring the contents in a nitrogen gas atmosphere, they were heated to 160° C. over an oil bath so as to dissolve them completely.

Thereafter, a solution which had been obtained by dissolving 17.59 g (0.101 mole) of a 80:20 (by molar ratio) mixture of tolylene-2,4-diisocyanate and tolylene-2,6-diisocyanate in 50 ml of N,N'-dimethylethyleneurea was added dropwise over 3 hours from the dropping funnel. After proceeding with the reaction for additional 2 hours, the heating was stopped and the reaction mixture was cooled to 15° C. with stirring. The resultant solution was poured into 2 l of chilled water in the same manner as in Example 1, thereby causing the resultant polymer to precipitate. The polymer was collected by filtration. After stirring and washing it in 2 l of chilled methanol twice, it was dried at 100° C. for 15 hours under a reduced pressure of 2–3 mmHg to obtain milky white polymer powder. It was dissolved in DMAc to measure its inherent viscosity. It was found to be 1.28.

EXAMPLE 5

In an apparatus similar to that employed in Example 1, were charged 17.90 g (0.05 mole) of 3,3',4,4'-benzophenonetetracarboxylic acid, 0.102 g (0.0005 mole) of potassium hydrogenterephthalate and 370 ml of anhydrous N,N'-dimethylethyleneurea. While stirring the contents in a nitrogen gas atmosphere, they were heated to 160° C. over an oil bath so as to dissolve them completely.

Thereafter, a solution which had been obtained by dissolving 8.80 g (0.505 mole) of a 80:20 (by molar ratio) mixture of tolylene-2,4-diisocyanate and tolylene-2,6-diisocyanate in 50 ml of anhydrous N,N'-dimethylethyleneurea was added dropwise over 3 hours from the dropping funnel. After proceeding with the reaction for additional 2 hours, the heating was stopped and the reaction mixture was cooled to room temperature with stirring. The resultant polymer was washed and dried in the same manner as in Example 4, thereby obtaining milky white polymer powder. It was dissolved in DMAc to measure its inherent viscosity. It was found to be 1.40.

EXAMPLE 6

Charged under a nitrogen gas atmosphere in a 1000-ml separable flask fitted with a stirrer, thermometer, condenser, dropping funnel and nitrogen inlet tube were 33.20 g (0.2000 mole) ff isophthalic acid, 0.0790 g (0.0004 mole) of sodium hydrogenisophthalate and 400 ml of anhydrous N,N'-dimethylethyleneurea. The contents were then heated with stirring to 200° C. over an oil bath. While maintaining the temperature of the reaction mixture at 200° C., a solution of 35.70 g (0.2050 mole) of tolylene-2,4-diisocyanate in 60 ml of anhydrous N,N'-dimethylethyleneurea was added dropwise over 4 hours from the dropping funnel. After proceeding with the reaction for additional 1 hours, the heating was stopped and the reaction mixture was allowed to cool down to room temperature. The reaction mixture was light yellowish. The cooled viscous solution was poured in vigorously-stirred water in an amount 3 times in volume the viscous solution, thereby causing the resultant polymer to precipitate. After thoroughly washing the polymer with a great deal of water, the polymer was collected by filtration. The polymer cake was dried at 150° C., for about 5 hours under a reduced pressure to obtain milky white polymer powder. Its inherent viscosity was 2.4. About 1 g of the polymer was dissolved in 20 ml of DMF solution which contained 2% of calcium chloride dissolved therein. After casting the solution on a glass plate, the glass plate was left over at room temperature for a long period of time. The resulting thin film which has been rendered self-supporting was peeled off, washed thoroughly with water and dried at 150° C. under a reduced pressure, thereby obtaining a thin film. The film was then subjected to a DSC measurement. As a result, the Tg and crystal melting peak temperature (Tm) of the polymer were determined to be about 265° C. and about 351° C., respectively. Furthermore, from an X-ray diffraction spectrum, it was confirmed to be a crystalline polymer having sharp peaks at diffraction angles ($2\theta$) of 10.1°, 14.9°, 22.4° and 25.7°.

COMPARATIVE EXAMPLE 3

A mixture of 31.06 g (0.1870 mole) of isophthalic acid, 0.7039 g (0.0037 mole) of sodium hydrogenisophthalate and 400 ml of anhydrous N-methyl-2-pyrrolidone was heated to 180° C., to which a solution of 33.23 g (0.1908 mole) of tolylene-2,4-diisocyanate in 30 ml of anhydrous N-methyl-2-pyrrolidone was added dropwise over 4 hours. The reaction mixture was then treated in the same manner as in Example 6. The resultant polymer was yellowish and its inherent viscosity was 1.22.

COMPARATIVE EXAMPLE 4

A mixture of 30.85 g (0.1857 mole) of isophthalic acid, 0.1908 g (0.0018 mole) of sodium carbonate and 400 ml of purified anhydrous sulfolane was heated to 200° C., to which a solution of 33.15 g (0.1903 mole) of tolylene-2,4-diisocyanate in 25 ml of purified anhydrous sulfolane was added dropwise over 4 hours. While cooling the reaction mixture after the reaction, the solution started clouding from about 150° C. and down and causing the resultant polymer to separate out. When the temperature dropped further to about 130° C., the separated polymer contained the solvent and was caused to swell. Thus, the entire mixture changed into a gel-like form. An additional portion of sulfolane in an amount of 500 ml was then added. The resultant mixture was cooled to room temperature while deflocculating same. It was however difficult to perform uniform stirring. The thus-cooled contents were treated in the same manner as in Example 6 to obtain light-yellowish polymer powder. The inherent viscosity of the polymer was 1.55. Furthermore, from an X-ray diffraction spectrum of the powder, it was confirmed to be a crystalline polymer having sharp peaks at diffraction angles ($2\theta$) of 10.0°, 15.0°, 22.5° and 25.7°. From its DSC measurement, the Tg and Tm of this polymer were found to be 261° C. and 350° C., respectively.

COMPARATIVE EXAMPLE 5

Following the procedure of Example 6 except for the exclusion of the sodium hydrogenisophthalate as a catalyst, a mixture of 31.57 g (0.1900 mole) of isophthalic acid and 400 ml of anhydrous N,N'-dimethylethyleneurea was heated to 200° C., to which a solution of 33.92 g (0.1948 mole) of tolylene-2,4-diisocyanate in 40 ml of anhydrous N,N'-dimethylethyleneurea was added dropwise over 4 hours. The reaction mixture was thereafter treated in the same manner as in Example 6 to obtain light-yellowish polymer powder. The inherent viscosity of the polymer was 0.42.

EXAMPLE 7

Following the procedure of Example 6, a high-concentration polymerization was carried out in an apparatus similar to that employed in Example 6. A mixture of 50.12 g (0.3017 mole) of isophthalic acid, 2.463 g (0.0121 mole) of potassium hydrogenisophthalate and 310 ml of anhydrous N,N'-dimethylpropyleneurea was heated to 220° C., to which 54.90 g (0.3152 mole) of tolylene-2,4-diisocyante was added dropwise over 6 hours to induce a reaction. After proceeding with the reaction for additional 1 hour, the reaction mixture was allowed to cool down to room temperature. The reaction mixture was light brownish. A portion of the thus-cooled viscous solution was taken out. It was subjected to post treatments in the same manner as in Example 6, thereby obtaining light-yellowish polymer powder. The inherent viscosity of the polymer was 3.4.

EXAMPLE 8

Charged in a 1000-ml separable flask fitted with a stirrer, thermometer, condenser and nitrogen inlet tube were 32.91 g (0.1981 mole) of isophthalic acid, 0.1102 g (0.0010 mole of anhydrous sodium carbonate, 35.36 g (0.2031 mole) of tolylene-2,4-diisocyanate and 450 ml of anhydrous N,N'-dimethylethyleneurea. The contents were then heated to 140° C. over an oil bath, at which the reaction was allowed to proceed for 10 hours. The reaction mixture was light yellowish. Three hours later, the removal of carbon dioxide became practically unobservable and the viscosity of the mixture increased significantly. However, no further viscosity increase was practically observed thereafter. The cooled viscous solution was treated in the same manner as in Example 6 to obtain light-yellowish polymer. Its inherent viscosity was 1.8.

EXAMPLE 9

Charged under a nitrogen gas atmosphere in a 1000-ml separable flask fitted with a stirrer, thermometer, condenser, dropping funnel and nitrogen inlet tube were 35.20 g (0.2119 mole) of terephthalic acid, 0.4325 g (0.0021 mole) of sodium hydrogen-terephthalate and 540 ml of anhydrous N,N'-dimethylethyleneurea. The contents were then heated with stirring to 220° C. over an oil bath. While maintaining the temperature of the reaction mixture at 220° C., a solution of 37.27 g (0.2140 mole) of tolylene-2,4-diisocyanate in 40 ml of anhydrous N,N'-dimethylethyleneurea was added dropwise over 4 hours from the droppnng funnel. After proceeding with the reaction for additional 1 hours, the heating was stopped and the reaction mixture was allowed to cool down to room temperature. The reaction mixture was light yellowish. The cooled viscous solution was poured in vigorously-stirred water in an amount 3 times in volume the viscous solution, thereby causing the resultant polymer to precipitate. After thoroughly washing the polymer with a great deal of water, the polymer was collected by filtration. The polymer cake was dried at 150° C. for about 3 hours under a reduced pressure to obtain milky white polymer powder. Its inherent viscosity was 3.2.

From an X-ray diffraction spectrum of the powder, it was confirmed to be a crystalline polymer having sharp peaks at diffraction angles (2θ) of 11.9°, 15.7°, 22.0° and 25.0°. In addition, from its DSC measurement, the glass transition temperature (Tg) and crystal melting peak temperature (Tm) of this polymer were found to be 320° C. and 426° C., respectively.

COMPARATIVE EXAMPLE 6

A mixture of 35.11 g (0.2133 mole) of terephthalic acid, 0.4314 g (0.0021 mole) of sodium hydrogen-terephthalate and 540 ml of anhydrous N-methyl-2-pyrrolidone was heated to 180° C., to which a solution of 33.17 g (0.2134 mole) of tolylene-2,4-diisocyanate in 40 ml of anhydrous N-methyl-2-pyrrolidone was added dropwise over 4 hours. The reaction mixture was then treated in the same manner as in Example 9. The resultant polymer was yellowish and its inherent viscosity was 1.32.

COMPARATIVE EXAMPLE 7

A mixture of 35.06 g (0.2110 mole) of terephthalic acid, 0.2237 g (0.0021 mole) of sodium carbonate and 670 ml of purified anhydrous sulfolane was heated to 200° C., to which a solution of 37.12 g (0.2131 mole) of tolylene-2,4-diisocyanate in 50 ml of purified anhydrous sulfolane was added little by little. When about one half of the whole volume had been added dropwise over about 2 hours, the polymerization mixture started clouding in its entirety and the resulting polymer began to separate out. Upon completion of the addition of the whole isocyanate in 4 hours after the initiation of its dropwise addition, the polymerization mixture changed in its entirety into a white slurry-like form. The mixture was then allowed to cool down to room temperature and subjected to post treatments in the same manner as in Example 9, thereby obtaining a milky white polymer. From an X-ray diffraction spectrum of the powder, it was confirmed to be a crystalline polymer having sharp peaks at diffraction angles (2θ) of 11.9°, 15.7°, 22.0° and 25.0°. In addition, from its DSC measurement, the glass transition temperature (Tg) and crystal melting peak temperature (Tm) of this polymer were found to be 320° C. and 424° C., respectively.

COMPARATIVE EXAMPLE 8

Following the procedure of Example 9 except for the exclusion of the monosodium terephthalate as a catalyst, a mixture of 34.91 g (0.2101 mole) of terephthalic acid and 520 ml of anhydrous N,N'-dimethylethyleneurea was heated to 220° C., to which a solution of 36.96 g (0.2122 mole) of tolylene-2,4-diisocyanate in 55 ml of anhydrous N,N'-dimethylethyleneurea was added dropwise over 4 hours. The reaction mixture was then treated in the same manner as in Example 9 to obtain milky white polymer powder. The inherent viscosity of the polymer was 0.47.

EXAMPLE 10

Charged in a 1000-ml separable flask fitted with a stirrer, thermometer, condenser and nitrogen inlet tube were 35.07 g (0.2111 mole) of terephthalic acid, 0.2238 g (0.0021 mole) of anhydrous sodium carbonate, 37.21 g (0.2136 mole) of tolylene-2,4-diisocyanate and 720 ml of anhydrous N,N'-dimethylpropyleneurea. The contents were then heated to 180° C. over an oil bath, at which they were caused to react for 10 hours. The reaction mixture was then cooled and treated in the same manner as in Example 9, thereby obtaining milky while polymer powder. The inherent viscosity of the polymer was 2.3.

EXAMPLE 11

Charged under a nitrogen gas atmosphere in a 1000-ml separable flask fitted with a stirrer, thermometer, condenser dropping funnel and nitrogen inlet tube were 35.05 g (0.2110 mole) of isophthalic acid, 0.7936 g (0.0042 mole) of sodium hydrogen-isophthalate and 485 ml of anhydrous N,N'-dimethylethyleneurea. The contents were then heated with stirring to 200° C. over an oil bath. While maintaining the temperature of the reaction mixture at 200° C., a solution of 37.67 g (0.2163 mole) of tolylene-2,6-diisocyanate in 30 ml of anhydrous N,N'-dimethylethyleneurea was added dropwise over 4 hours from the dropping funnel. After proceeding with the reaction for additional 1 hours, the heating was stopped and the reaction mixture was allowed to cool down to room temperature. The cooled viscous solution was poured in vigorously-stirred water in an amount twice in volume the viscous solution, thereby causing the resultant polymer to precipitate. After thoroughly washing the polymer with a great deal of water, the polymer was collected by filtration. The polymer cake was dried at 150° C., for 3 hours under a reduced pressure to obtain light-yellowish polymer powder.

The inherent viscosity of the polymer was 2.0. About 1 g of the polymer was dissolved in 20 ml of an N,N'-dimethylformamide solution which contained 3% of lithium chloride dissolved therein. After casting the solution on a glass plate, the solution was dried at room temperature in air for 3 days to obtain a self-supporting thin film which was somewhat cloudy in its entirety. The thin film was peeled off, washed thoroughly in running warm water, and then dried overnight at 150° C. under a reduced pressure. The film was then subjected to a DSC measurement. As a result, the glass transition temperature (Tg) and crystal melting peak temperature (Tm) of the polymer were determined to be 260° C. and 423° C., respectively. Furthermore, from an X-ray diffraction spectrum of the film, it was confirmed to be a crystalline polymer having sharp peaks at diffraction angles ($2\theta$) of 0.6°, 16.0°, 18.7° and 25.0°.

COMPARATIVE EXAMPLE 9

Following the procedure of Example 11, poly(2-methyl-1,3-phenyleneterephthalic amide) was synthesized using N-methyl-2-pyrrolidone as a solvent and sodium hydrogenisophthalate as a catalyst in an apparatus similar to that used in Example 11. Namely, a mixture of 35.10 g (0.2113 mole) of isophthalic acid, 0.7949 g (0.0042 mole) of sodium hydrogenisophthalate and 450 ml of anhydrous N-methyl-2-pyrrolidone was heated to 180° C., to which a solution of 37.72 g (0.2166 mole) of tolylene-2,6-diisocyante in 35 ml of anhydrous N-methyl-2-pyrrolidone was added dropwise over 4 hours. The reaction mixture was then treated in the same manner as in Example 11. The thus-obtained polymer was yellowish brown and its inherent viscosity was 1.2.

COMPARATIVE EXAMPLE 10

Following the procedure of Example 11, poly(2-methyl-1,3-phenyleneterephthalic amide) was synthesized using sodium carbonate as a catalyst and purified sulfolane as a solvent in an apparatus similar to that used in Example 11. Namely, a mixture of 34.97 g (0.2104 mole) of isophthalic acid, 0.2231 g (0.0021 mole) of sodium carbonate and 450 ml of purified anhydrous sulfolane was heated to 200° C., to which a solution of 37.56 g (0.2157 mole) of tolylene-2,6-diisocyante in 33 ml of purified anhydrous sulfolane was added dropwise over 4 hours. While cooling the reaction mixture after the reaction, the solution started clouding and its viscosity began to increase from about 160° C. and down. When the temperature dropped further to about 140° C., the resultant polymer separated out rapidly and at the same time, contained the solvent so that it underwent swelling. Thus, the entire mixture changed into a gel-like form. An additional portion of sulfolane in an amount of 500 ml was then added. The resultant mixture was cooled while trying it to flocculate. It was however difficult to perform unifomm stirring. The thus-cooled contents were treated in the same manner as in Example 11 to obtain milky white polymer powder. The inherent viscosity of the polymer was 1.4. From an X-ray diffraction spectrum of the powder, it was confirmed to be a crystalline polymer having sharp peaks at diffraction angles ($2\theta$) of 10.5°, 16.0°, 18.8° and 25.0°. From its DSC measurement, its glass transition temperature (Tg) and crystal melting peak temperature (Tm) were found to be 262° C. and 421° C., respectively.

COMPARATIVE EXAMPLE 11

Following the procedure of Example 11 except for the exclusion of the sodium hydrogenisophthalate as a catalyst, a mixture of 34.91 g (0.2101 mole) of isophthalic acid and 450 ml of anhydrous N,N'-dimethylethyleneurea was heated to 200° C., to which a solution of 37.51 g (0.2154 mole) of tolylene-2,6-diisocyanate in 33 ml of anhydrous N,N'-dimethylethyleneurea was added dropwise over 4 hours. The reaction mixture was then treated in the same manner as in Example 11 to obtain light-yellowish polymer powder.

The inherent viscosity of the polymer was 0.39.

EXAMPLE 12

Polymerization was conducted at a high concentration in the same manner as in Example 11. Namely, a 1.726 g (0.0085 mole) of potassium hydrogenisophthalate mixture of 35.13 g (0.2114 mole) of isophthalic acid and 500 ml of anhydrous N,N'-dimethylpropyleneurea was heated to 220° C., to which 38.48 g (0.2210 mole) of tolylene-2,6-diisocyanate was added dropwise over 6 hours. After allowing the reaction to proceed for additional 1 hour, it was allowed to cool down to room temperature. The reaction mixture was light yellowish. A portion of the thus-cooled viscous solution was taken out. It was subjected to post treatments in the same manner as in Example 11 to obtain light-brownish polymer powder.

The inherent viscosity of the polymer was 2.8.

EXAMPLE 13

Charged in a 1000-ml separable flask fitted with a stirrer, thermometer, condenser and nitrogen inlet tube were 35.06 g (0.2110 mole) of isophthalic acid, 0.2239 g (0.0021 mole) of anhydrous sodium carbonate, 37.67 g (0.2163 mole) of tolylene-2,6-diisocyanate and 490 ml of anhydrous N,N'-dimethylethyleneurea. The contents were then heated to 140° C. over an oil bath, at which the reaction was allowed to proceed for 10 hours. The reaction mixture was light brownish. About three hours later, the generation of carbon dioxide became practically unobservable and the viscosity of the mixture increased significantly. However, no further viscosity increase was practically observed thereafter. After completion of the reaction, a portion of the reaction mixture which had been allowed to cool down to room temperature was treated in the same manner as in Example 11 to obtain light-brownish polymer powder.

The inherent viscosity of the polymer was 1.6.

EXAMPLE 14

Charged under a nitrogen gas atmosphere in a 1000-ml separable flask fitted with a stirrer, thermometer, condenser, dropping funnel and nitrogen inlet tube were 25.02 g (0.1506 mole) of terephthalic acid, 0.3074 g (0.0015 mole) of potassium hydrogenterephthalate and 630 ml of anhydrous N,N'-dimethylethyleneurea. The contents were then heated with stirring to 220° C. over an oil bath. While maintaining the temperature of the reaction mixture at 220° C., a solution of 26.63 g (0.1529 mole) of tolylene-2,6-diisocyanate in 60 ml of anhydrous N,N'-dimethylethyleneurea was added dropwise over 2 hours from the dropping funnel. After proceeding with the reaction for additional 2 hours, the heating was stopped and the reaction mixture was allowed to cool down to room temperature. The reaction mixture was light yellowish. The cooled viscous solution was poured in vigorously-stirred water in an amount 3 times in volume the viscous solution, thereby causing the resultant polymer to precipitate. After thoroughly washing the polymer with a great deal of water, the polymer was collected by filtration. The polymer cake was dried at 150° C. for about 3 hours under a reduced pressure to obtain milky white polymer powder. Its inherent viscosity was 1.4.

COMPARATIVE EXAMPLE 12

Following the procedure of Example 14, a mixture of 25.11 g (0.1511 mole) of terephthalic acid, 0.3080 g (0.0015 mole) of potassium hydrogenterephthalate and 630 ml of anhydrous N-methyl-2-pyrrolidone was heated to 180° C. in an apparatus similar to that used in Example 14, to which a solution of 26.71 g (0.1534 mole) of tolylene-2,6-diisocyanate in 60 ml of anhydrous N-methyl-2-pyrrolidone was added dropwise over 2 hours. After allowing the reaction to proceed for additional 2 hour, it was treated in the same manner as in Example 14. The resultant polymer was yellowish brown and its inherent viscosity was 1.28.

COMPARATIVE EXAMPLE 13

Following the procedure of Example 14 except for the exclusion of the potassium hydrogenterephthalate as a catalyst, a mixture of 25.08 g (0.1510 mole) of terephthalic acid and 630 ml of anhydrous N,N'-dimethylethyleneurea was heated to 220° C., to which a solution of 26.69 g (0.1532 mole) of tolylene-2,6-diisocyanate in 60 ml of anhydrous N,N'-dimethylethyleneurea was added dropwise over 2 hours. Then, the reaction was allowed to proceed for additional 2 hour. The reaction mixture was treated in the same manner as in Example 14 to obtain milky white polymer powder. The inherent viscosity of the polymer was 0.42.

EXAMPLE 15

Using an apparatus similar to that employed in Example 14, a liquid mixture of 35.10 g (0.2112 mole) of terephthalic acid, 0.2239 g (0.0021 mole) of anhydrous sodium carbonate and 450 ml of anhydrous N,N'-dimethylpropyleneurea was heated to 220° C., to which a solution of 37.62 g (0.2160 mole) of tolylene-2,6-diisocyanate in 30 ml of anhydrous N,N'-dimethylpropyleneurea was added dropwise over 2 hours. Thereafter, the reaction was allowed to proceed for additional 2 hours. The reaction mixture obtained upon completion of the reaction was light-yellowish and somewhat clouded. The reaction mixture was subjected to post treatments in the same manner as in Example 14, thereby obtaining milky white polymer powder. The inherent viscosity of the polymer was 1.3. From an X-ray diffraction spectrum of the powder, it was confirmed to be a crystalline polymer having sharp peaks at diffraction angles ($2\theta$) of 16.8°, 19.4°, 21.9°, 25.0° and 27.2°.

In addition, from results of a differential thermal analysis of the polymer powder, the glass transition temperature (Tg) and crystal melting peak temperature (Tm) of this polymer were found to be 287° C. and 454° C., respectively.

What is claimed is:

1. In a process for preparing a polyamide or a polyamide containing polyimide units by subjecting a polycarboxylic acid represented by the following formula (I):

$$R_q^1(COOH)_n \qquad (I)$$

wherein q is 0 or 1, n is 2, 3 or 4, $R^1$ is an organic group having a valency of 2–4, when n is 3, two of the three carboxyl groups are bonded at positions to permit formation of an acid anhydride, and when n is 4, the four carboxyl groups are bonded at positions to permit formation of 2 sets of acid anhydrides, and a diisocyanate represented by the following formula (II):

$$OCN-R^2-NCO \qquad (II)$$

wherein $R_2$ is a divalent organic group, to polycondesnation at a temperature above 100° C. in the presence of an alkali metal carbonate, alkali metal hydrogencarbonate, alkali metal hydroxide or an alkali metal salt of a polyycarboxylic acid, said alkali metal salt being represented by the following formula (III):

$$R_q^1(COOH)_l(COOM)_m \qquad (III)$$

wherein $R^1$ and q have the same meanings as defined in the formula (I), M denotes an alkali metal, l is an integer of 0–3, m stands for an integer of 1–4 and l+m is 2–4, the improvement wherein an N,N'-dimethylalkyleneurea compound represented by the following formula (IV):

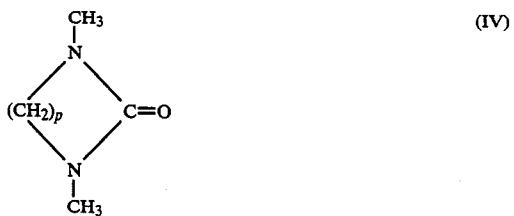

wherein p stands for 2 or 3 is used as a solvent.

2. The process as claimed in claim 1, wherein the N,N'-dimethylalkyleneurea compound is N,N'-dimethylethyleneurea.

3. The process as claimed in claim 1, wherein the alkali metal compound is an alkali metal salt of an aromatic dicarboxylic acid.

4. The process as claimed in claim 3, wherein the alkali metal salt of the aromatic dicarboxylic acid is the monopotassium or monosodium salt of isophthalic or terephthalic acid.

5. The process as claimed in claim 1, wherein the alkali metal compound is potassium carbonate, sodium carbonate, potassium hydrogencarbonate or sodium hydrogencarbonate.

6. The process as claimed in claim 1, wherein the alkali metal compound is potassium hydroxide or sodium hydroxide.

7. In a process for preparing a polyamide by subjecting a compound of the group consisting of tolylene-2,4-diisocyanate and tolylene-2,6-diisocyanate, and a compound of the group consisting of isophthalic acid and terephthalic acid, to polycondensation at a temperature above 100° C. in the presence of an alkali metal carbonate, alkali metal hydrogencarbonate, alkali metal hydroxide or an alkali metal salt of a polycarboxylic acid, said alkali metal salt being represented by the following formula (III):

$$R_p^1(COOH)_l(COOM)_m \qquad (III)$$

wherein p is 0 or 1, $R^1$ is an organic group having a valency of 2-4, M denotes an alkali metal, l is an integer of 0-3, m stands for an integer of 1-4 and l+m is 2-4, when l+m is 3, two of the three caroxyl groups are bonded at positions to permit formation of an acid anhydride, and when l+m is 4, the four carboxyl groups are bonded at positions to permit formation of 2 sets of acid anhydrides, the improvement wherein an N,N'-dimethylalkyleneurea compound represented by the following formula (IV):

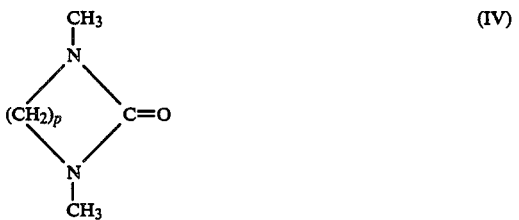

wherein p stands for 2 or 3 is used as a solvent.

8. The process as claimed in claim 7, wherein the N,N'-dimethylalkyleneurea compound is N,N'-dimethylethyleneurea.

9. The process as claimed in claim 7, wherein the alkali metal compound is an alkali metal salt of an aromatic dicarboxylic acid.

10. The process as claimed in claim 9, wherein the alkali metal salt of the aromatic dicarboxylic acid is the monopotassium or monosodium salt of isophthalic or terephthalic acid.

11. The process as claimed in claim 7, wherein the alkali metal carbonate is potassium carbonate or sodium carbonate.

12. The process as claimed in claim 7, wherein the alkali metal hydrogencarbonate is sodium hydrogencarbonate or potassium hydrogencarbonate.

13. The process as claimed in claim 7, wherein the alkali metal hydroxide is potassium hydroxide or sodium hydroxide.

14. The process as claimed in claim 7, wherein the tolylene-2,4-diisocyanate contains tolylene-2,6-diisocyanate in an amount not exceeding 10 mole % of the former diisocyanate.

15. The process as claimed in claim 7, wherein the tolylene-2,6-diisocyanate contains tolylene-2,4-diisocyanate in an amount not exceeding 10 mole % of the former diisocyanate.

16. The process as claimed in claim 7, wherein the isophthalic acid contains terephthalic acid in an amount not exceeding 10 mole % of the former acid.

17. The process as claimed in claim 7, wherein the terephthalic acid contains isophthalic acid in an amount not exceeding 10 mole % of the former acid.

18. The process as claimed in claim 1 wherein, in formula (I), n is 2.

19. The process as claimed in claim 3 wherein, in formula (I), n is 2.

20. The process as claimed in claim 18 wherein, the compound of formula I is a compound selected from the group consisting of malonic acid, fumaric acid, succinic acid, glutaric acid, adipic acid, pimelic acid, suberic acid, azelaic acid, sebacic acid, terephathalic acid, isophtahlic acid, hexahydroterephthalic acid, diphenylether-4,4'-dicrrboxylic acid, diphenylsulfone-4,4'-dicarboxylic acid, biphenyl-4,4'-dicarboxylic acid, thiophene-2,5-dicarboxylic acid, pyridine-2,6-dicarboxylic acid, naphthalene-2,6-dicarboxylic acid, 4,4'-diphenylether-bis-trimellitic imide acid and 4,4'-diphenylmethane-bis-trimellitic imide acid.

21. The process as claimed in claim 19 wherein, the compound of formula I is a compound selected from the group consisting of malonic acid, fumaric, acid, succinic acid, glutaric acid, adipic acid, pimelic acid, suberic acid, azelaic acid, sebacic acid, terephathalic acid, isophathalic acid, hexahydroterephathalic acid, diphenylether-4,4'-dicarboxylic acid, diphenylsulfone-4,4'-dicarboxylic acid, biphenyl-4,4'-dicarboxylic acid, thiophene-2,5-dicarboxylic acid, pyridine-2,6-dicarboxylic acid, naphthalene-2,6-dicarboxylic acid, 4,4'-diphenylether-bis-trimellitic imide acid and 4,4'-diphenylmethane-bis-trimellitic imide acid.

* * * * *